Patented May 16, 1950

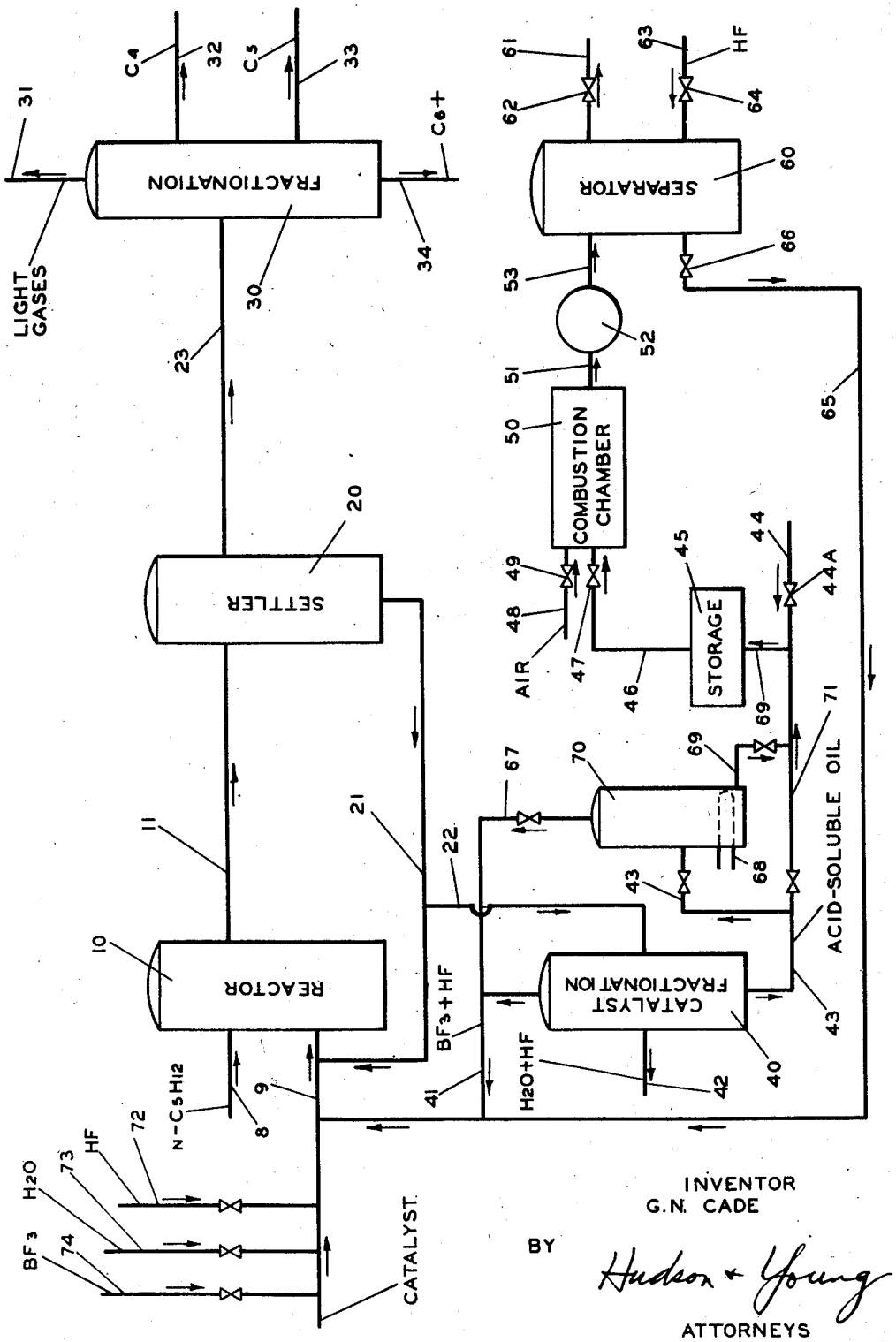

2,507,499

UNITED STATES PATENT OFFICE 2,507,499

RECOVERY OF BORON FLUORIDE

George N. Cade, Bartlesville, Okla., assignor to Phillips Petroleum Company, a corporation of Delaware Application September 23, 1946, Serial No. 698,747

12 Claims. (Cl. 260—683.4)

This invention relates to the recovery of boron. In a specific embodiment the invention relates to recovering boron from organic material. One aspect of the invention relates to the treatment of hydrocarbons or other organic reactants with catalysts or treating agents comprising a boron halide under such conditions that some boron becomes incorporated in a complex with the organic material, and to the treatment of the resulting complex to recover the boron content thereof in the form of a boron halide which can then be reused in the process. One feature of the invention relates to hydrocarbon conversion processes effected in the presence of a catalyst comprising boron trifluoride, hydrogen fluoride, and relatively minor amounts of water; acid-soluble oils are recovered from the catalyst and treated to recover boron therefrom, in the form of an admixture of boron fluoride, hydrogen fluoride and water which is recycled to the conversion as catalyst.

The use of concentrated hydrogen fluoride as catalyst for effecting many organic reactions has increased greatly in recent years. It has been found in many instances that the use of a minor proportion of boron fluoride with the hydrogen fluoride greatly increases the catalytic activity and/or the selectivity of the catalyst. It has likewise been found that for certain reactions at least, the catalyst may also comprise water in amounts ranging from traces up to 30% or more. Another useful catalyst is composed of boron fluoride and water alone, commonly termed boron fluoride hydrate, and ordinarily prepared by saturating water with boron fluoride at near-atmospheric temperatures.

Among the reactions which are catalyzed by hydrogen fluoride and/or boron fluoride may be mentioned the alkylation of aromatic compounds with various alkylating reactants including olefins, alcohols, alkyl halides, etc. Paraffinic and cycloparaffinic (naphthenic) hydrocarbons may also be alkylated with such catalysts and such alkylating reactants. Furthermore, various hydrocarbons, particularly paraffinic hydrocarbons, may be isomerized; ordinarily one isomer is converted to a corresponding branched or more branched isomer although the reverse reaction may be accomplished if desired. The esterification reaction between organic acids and alcohols, and the etherification reaction between alcohols and alkyl halides, may also be mentioned as examples of reactions catalyzed by HF and/or $BF_3$. Likewise, hydrocarbons may be subjected to disproportionation reactions whereby hydrocarbons of both lower and higher molecular weights are concomitantly formed. It will be appreciated that particular catalyst compositions which are effective for one type of conversion will not necessarily be equally effective for another conversion, and may in some cases be completely incapable of effecting a different conversion. Suitable catalyst compositions for any particular reaction are well known in the art, and hence need not be discussed here in further detail. Mixtures of boron fluoride and hydrogen fluoride have likewise been employed as solvents for removing sulfur compounds, oxygen compounds and unsaturated compounds from hydrocarbons or other organic materials.

When catalysts or treating agents of the foregoing nature are contacted with organic compounds, materials known as acid-soluble oils are formed. These oils are of a complex nature and contain organic material as well as boron and fluorine in combined form. The exact nature of the acid-soluble oils and the manner in which the boron and the fluorine are combined with the organic material are not clearly understood. Probably some boron fluoride-hydrocarbon complexes are present, and substantial amounts of fluorine are present in the form of organic fluorides. Accumulation of acid-soluble oils in the catalyst or treating agent lowers the efficiency thereof, and it is necessary to separate acid-soluble oils from the bulk of the catalyst or treating agent either intermittently or continuously. This may readily be done by distillation or vaporization of the boron fluoride, HF, or water, leaving a residue of acid-soluble oils. The latter are ordinarily discarded and accordingly represent serious losses of boron and fluoride.

It is an object of this invention to recover boron from organic material containing boron in combined form.

It is another object of the invention to subject acid-soluble oils, resulting from use of boron halide-containing catalysts or treating agents to effect organic reactions or treat organic materials, to a treatment effective in recovering the boron content in a form suitable for reuse in the process.

Still another object is to subject hydrocarbons to conversion in the presence of a catalyst comprising boron fluoride, hydrogen fluoride, and water.

A still further object of the invention is to reduce the consumption of boron fluoride in processes of the nature described.

Yet another object is to subject boron-containing materials to a step-wise treatment resulting in the production of a $BF_3$—$HF$—$H_2O$ mixture having catalytic activity.

Other objects and advantages of the invention will be apparent, to one skilled in the art, from the accompanying disclosure and discussion.

My invention will be described with particular reference to the disproportionation of a paraffin hydrocarbon, specifically normal pentane. It will, of course, be understood that the principles disclosed herein may likewise be applied, with suitable modifications where necessary, to other types of conversion or treating processes, including those of the nature described above.

In a preferred embodiment of the invention an acid-soluble oil, recovered from a catalyst comprising hydrogen fluoride plus minor proportions of boron fluoride and water, is subjected to complete oxidation to convert the boron content thereof to boron oxide. The acid-soluble oil may first be heated to drive off a portion of the boron in the form of boron trifluoride. The boron oxide formed as just described is next reacted with concentrated hydrogen fluoride, which is preferably used in large excess, to produce a resulting mixture of hydrogen fluoride, boron fluoride, and water, the principal reaction apparently being the formation of boron fluoride and water in accordance with the following equation:

$$B_2O_3 + 6HF \rightarrow 2BF_3 + 3H_2O$$

The resulting mixture is then recycled for incorporation in the main body of the catalyst. The procedure will be described in more detail below in conjunction with the drawing.

The present invention is particularly effective in conjunction with the reconstruction of hydrocarbons. It has been shown that in the presence of substantial proportions of hydrofluoric acid, and under suitable conditions of time and temperature, saturated hydrocarbons are reconstructed to hydrocarbons of different carbon-skeleton arrangement and different boiling point. Paraffinic hydrocarbons, for example, undergo conversion to isomers and also undergo conversion to hydrocarbons of both lower and higher molecular weights and correspondingly lower and higher boiling temperatures. It was later found that a marked improvement in the efficiency and utilization of concentrated hydrofluoric acid as a catalyst for reconstructing hydrocarbons is brought about by including with it a minor proportion of boron fluoride. As disclosed in the copending application of Frederick E. Frey, Serial No. 511,444, Patent No. 2,461,541, filed November 23, 1943, hydrocarbons, preferably saturated hydrocarbons such as the paraffins and cycloparaffins, are treated with concentrated hydrofluoric acid which contains or which has added to it a minor proportion of boron fluoride, to produce other hydrocarbons. As further disclosed in said application of Frederick E. Frey, the catalyst may be improved by the addition of a small amount of water, which will be discussed in more detail herein below. By simple modifications of the hydrocarbon reconstruction process, paraffin hydrocarbons may be converted to other paraffin hydrocarbons isomeric with the paraffins treated; furthermore, paraffin hydrocarbons may be converted to other paraffin hydrocarbons having more and/or fewer carbon atoms per molecule; likewise, cycloparaffins may be converted to other cycloparaffins having different alkyl groups and/or a different number of carbon atoms in the ring. In carrying out the process, it appears that two types of reaction occur. One of these reactions is true isomerization as when normal butane is converted to isobutane, normal pentane to isopentane, methylcyclopentane to cyclohexane and the like, and also the reverse of these reactions. The other reaction which appears to be involved is primarily one of disproportionation, as when normal pentane is converted to more or less equimolar amounts of butanes and hexanes with the iso compounds generally predominating. In many instances these two types of reactions take place concurrently with the formation of products which include isomers of the original hydrocarbons treated and hydrocarbons having fewer and greater numbers of carbon atoms per molecule. However, in most cases the reaction conditions may be controlled particularly with the inclusion of modifying agents, to vary the ratio of these reaction types. The process is directed primarily to converting low-boiling saturated hydrocarbons having at least four carbon atoms per molecule and boiling below about 450° F., although at times saturated hydrocarbons boiling outside this range may be treated.

The different types of reactions which are believed to be involved in the reconstruction of saturated hydrocarbons in accordance with the process may be exemplified as follows:

(1)  $2C_5H_{12} \rightleftarrows C_6H_{14} + C_4H_{10}$
     (pentanes)   (hexanes)   (butanes)

(2)  (a) n-heptane $\rightleftarrows$ branched heptanes
     (b)    n-butane $\rightleftarrows$ isobutane (3)  $C_6H_{12} \rightleftarrows CH_3C_5H_9$
     (cyclohexane)  (methylcyclopentane)

Although several other types of reaction probably also take place in the reconstruction process, the above mentioned types appear to account for most of the effects which are produced. The general term "reconstruction" is used herein to denote the production of one or more of the above mentioned effects and/or other advantageous effects which result from the practice of the process.

The catalyst employed comprises a major proportion of hydrofluoric acid modified or activated by a minor proportion of boron trifluoride. No nickel or other additional catalytic agent is required, and in many cases the reactions may be carried out at normal atmospheric temperature or at a temperature only somewhat higher than atmospheric temperature. In its preferred form, the catalyst comprises a homogeneous liquid solution of boron fluoride in a large excess of liquid hydrofluoric acid. (In determining the so-called "K constants" of solutions of boron trifluoride in liquid anhydrous hydrofluoric acid it has been determined that there appears to be primarily a true solution of boron trifluoride in the liquid hydrofluoric acid.) However, in certain reactions, an induction period has been observed which, in certain instances, has been eliminated by the addition of reactive hydrocarbons, such as olefins. Also, complexes between hydrocarbons and the catalyst ingredients have been found in the catalyst phase after use. In a still further preferred modification there is included in this catalytic mixture a small amount of water since, as will be shown hereinafter, the use of strictly anhydrous hydrofluoric acid and a minor amount of boron trifluoride as the catalyst is accompanied by the formation of an appreciable amount of sludge. This sludge does not make the use of an anhydrous catalyst impractical or uneconomical but, as can readily be appreciated, is undesirable. It has been found that when the catalyst is not strictly anhydrous, but contains a small amount of water, there is a much smaller amount of sludge formed.

The accompanying drawing is a schematic flow diagram showing one arrangement of apparatus elements and flow of materials therethrough suitable for the practice of my invention as applied to a pentane disproportionation system. It will readily be appreciated that the representation in the drawing is diagrammatic in nature, and that, for the sake of simplicity, many conventional items such as valves, pumps, heat exchangers, automatic controls, and the like are not shown, inasmuch as their nature and use is well understood to those skilled in the art.

In the drawing, normal pentane enters reactor 10 through conduit 8 and is intimately mixed with the catalyst which enters through conduit 9. The catalyst comprises liquid hydrofluoric acid containing from 0.1 to 10 weight per cent boron fluoride plus small amounts of water. Hydrogen fluoride may be introduced through conduit 72, water through conduit 73, and boron fluoride through conduit 74. Although the amount of boron trifluoride may be as much as about 20 to 30% by weight of the hydrofluoric acid, it is found that with pentane as the reactant there is little benefit to be derived by use of more than 10% $BF_3$. Substantially more drastic reaction conditions are necessary in effecting the reconstruction of butane, which ordinarily requires greater amounts of boron trifluoride together with somewhat higher temperatures and longer reaction times.

The concentration of water in the reactor should be at least about 0.05% by weight of the $HF$—$BF_3$ catalyst and generally need not exceed about 1.0% by weight although in some instances higher concentrations may be found to be desirable. However, the amount of water used should not exceed the molecular equivalent of boron trifluoride present since apparently the water disappears as such through the formation of a complex with the boron trifluoride and an appreciable amount of free boron trifluoride must be present to effect the reconstruction reactions at a desirably rapid rate in the preferred temperature range. The percentages of boron trifluoride mentioned above referred to the amount of free boron trifluoride present over and above that which is molecularly equivalent to the water content of the catalyst.

In reactor 10 normal pentane is converted to a mixture of hydrocarbons comprising butanes, isopentane, hexanes, and heavier hydrocarbons, in addition to smaller amounts of propane and lighter. Conditions generally suitable for the reaction are: temperature, 70 to 200° F.; pressure, sufficient to maintain the reactants in the liquid phase; volume ratio of hydrocarbon to catalyst, about 1:1; reaction time, 5 minutes to one hour. The reaction is preferably conducted continuously, although batch operation may be employed if desired. Reactor 10 may take the form of a pressure vessel agitated with suitable paddles or internal pumps or other arrangements well known to the art.

After a suitable reaction time, the hydrocarbon-catalyst mixture is passed through conduit 11 to settler 20 in which it separates into a heavy catalyst phase and a light hydrocarbon phase. The hydrocarbon phase is passed through conduit 23 to a fractionation system indicated diagrammatically by fractionation zone 30. This in ordinary practice will comprise a series of two or more fractional distillation columns and associated equipment. A light fraction comprising the hydrofluoric acid and boron trifluoride dissolved in the hydrocarbon phase together with propane is recovered through line 31. Components of this fraction may be separated and recycled if desired by means not shown in the drawing. The propane and any lighter hydrocarbons may be passed (by means not shown) to subsequent utilization in the boron recovery unit as described below. The butane fraction, which is largely isobutane, is recovered through line 32. The pentane fraction is recovered through line 33. Unreacted normal pentane is preferably separated and recycled to the reaction. A fraction comprising branched chain hexanes and heavier hydrocarbons is recovered through outlet 34. The isobutane, isopentane, and hexanes and heavier fractions are the desired products of the reconstruction process.

Most of the catalyst phase is recycled from settler 20 via conduit 21 to the reactor 10 for reuse as catalyst. A portion, however, is withdrawn intermittently or continuously through conduit 22 to catalyst fractionation system 40 for purification and recovery of boron and fluorine therefrom. Unit 40 ordinarily comprises one or two fractional distillation columns and related equipment and may also comprise one or more simple flash chambers or drums. Acid-resistant alloys may be employed in the manufacture of this equipment or at least in that portion which comes in contact with highly corrosive concentrations of aqueous hydrofluoric acid. A low-boiling fraction comprising substantially anhydrous HF and a minor proportion of $BF_3$ is withdrawn from unit 40 via conduit 41 and is recycled to reactor 10 via conduits 65 and 9. Any undesirably high excess of water which may accumulate in the catalyst phase is withdrawn as desired through the outlet 42 as a fraction comprising water and HF, usually in azeotropic proportions. A residue comprising acid-soluble oils is recovered through conduit 43. The oil may be passed via conduit 71 and 69 to storage 45 if desired.

The acid-soluble oils are preferably passed into unit 70 equipped with heater 68 and subjected therein to elevated temperatures for a sufficient time to recover a substantial part of the combined boron and fluorine contained therein in the form of $BF_3$ and HF which may be returned to the reactor 10 by means of lines 67, 41, 65 and 9. Appreciable amounts of hydrocarbon materials may also be recovered in this manner. It is often impossible, however, to recover all of the boron present in the acid-soluble oils by simple heating even though extremely high temperatures are used, as is shown in Example I below. In accordance with my invention, therefore, the residue which is passed via line 69 into storage 45 is subjected to treatment for recovery of boron. Preferably a hydrocarbon such as propane is introduced via line 44 provided with valve 44A into line 69 or storage unit 45 to facilitate handling of the relatively heavy boron-containing residue, and to aid in the subsequent combustion thereof. The hydrocarbon is preferably in the form of a liquid, and may comprise propane and/or lighter hydrocarbons recovered from the disproportionation reaction by means of line 31. Ordinarily the combustion is effected intermittently, although when the rate of production of acid soluble oils is sufficiently high to justify it, continuous operation is employed.

The acid-soluble oil is passed from storage means 45 through conduit 46 provided with valve 47 to combustion chamber 50, in which it is substantially completely burned in the presence of air or other oxygen-containing gas which is introduced through inlet 48 provided with valve 49. Combustion chamber 50 may be of any suitable design so long as it is provided with a burner suitable for handling heavy oils. The combustion products, which comprise chiefly boric oxide, carbon dioxide, and steam, are passed through conduit 51 to cooling zone 52 in which they are rapidly cooled to a temperature in the range of about 400 to 900° F. in order to cause the boric oxide to separate as a solid suspended in combustion gases. The velocity of the combustion gases through combustion chamber 50 and cooling unit 52 is preferably sufficiently high to minimize deposition of boric oxide. The cool combustion products are passed via conduit 53 into separator 60, which includes conventional apparatus for separating solids from gases, such as a cyclone separator, bag filter, Cottrell precipitator, or a combination of two or more of these devices. The combustion gases are withdrawn through outlet 61 equipped with valve 62.

When a suitable amount of boric oxide has accumulated in separator 60, valves 44A, 47, 49 and 62 are closed and valves 64 and 66 are opened. Concentrated hydrofluoric acid, preferably anhydrous, is passed through inlet conduit 63 into separator 60, and dissolves the accumulated boric oxide, converting it to boron fluoride and water. The amount of hydrofluoric acid added is preferably about 5 to 30 times the amount theoretically required to effect complete conversion in accordance with the equation:

$$B_2O_3 + 6HF \rightarrow 2BF_3 + 3H_2O$$

The large excess of hydrofluoric acid is used with the aim of promoting the completion of the reaction and minimizing formation of intermediate acids containing boron, fluorine, and oxygen. The excess hydrogen fluoride also results in the formation of a total reaction mixture in which HF is the major component and $BF_3$ and water are present in relatively small amounts, thus corresponding approximately to the composition of the catalyst. Accordingly, the total reaction mixture is recycled through conduit 65 to reactor 10 where it becomes incorporated with the catalyst. In conversions such as the disproportionation reaction described herein, in which boron fluoride should be present in molecular excess over the water, it usually results that the quantity of makeup boron fluoride introduced through conduit 74 is adequate to maintain this excess over the water formed in the reaction between the boric oxide and HF. However, in the event that boron fluoride makeup is insufficient to maintain the desired excess, water may be removed from the system by any suitable method, for example, as an HF-water azeotrope from catalyst fractionator 40 through line 42, to the extent necessary to maintain the desired $BF_3$–$H_2O$ ratio in the system. In another modification, sometimes preferred, the used catalyst is distilled to remove acid-soluble oil, and the oil-free fraction or a portion thereof is distilled in the presence of sulfuric acid to remove water. Another method is to distill the $BF_3$—$H_2O$—HF reaction product mixture resulting from reaction of boric oxide with excess HF, in the presence of sulfuric acid to recover $BF_3$ and/or HF with a substantially reduced water content. If desired, the reaction product mixture may be passed to the catalyst fractionation system, rather than to admixture with the total catalyst in the reactor, so that water may be removed through line 42. In conversions in which an excess of water can be tolerated these procedures may not be necessary.

It may often be desirable to introduce the hydrogen fluoride which is to dissolve the boric oxide into combustion chamber 50 and/or cooling zone 52 in order to dissolve accumulated deposits of boric oxide. The resulting material may then be passed on through separator 60 to dissolve boric oxide accumulated therein. Temperatures of about 20 to 100° C. are adequate for the $B_2O_3$—HF reaction.

It will be understood by those skilled in the art that the present invention may be practiced by arrangements of apparatus other than that shown diagrammatically in the drawing. For example, combustion chamber 50, cooling zone 52, and separator 60 may be combined in a single piece of apparatus, somewhat similar to the type commonly used in preparing channel black, in which the acid-soluble oil is burned and the combustion products impinge against cooled baffles, which are subsequently sprayed with liquid anhydrous hydrofluoric acid to remove and recover the deposited solid boric oxide. Furthermore, the recovery operation may be made substantially continuous by using a stand-by combustion chamber, cooling zone, and separator, identical with those represented in the drawing by the numerals 50, 52, and 60, respectively, in which the combustion and the boric oxide separation are conducted while the accumulated boric oxide in separator 60 is being treated with hydrofluoric acid as previously described.

The following examples are given to illustrate certain features of the invention. It will, of course, be understood that the invention in its broad scope is not necessarily limited to the particular conditions disclosed in the examples.

EXAMPLE I

Several different hydrocarbon conversion reactions catalyzed by liquid anhydrous hydrofluoric acid containing from 2 to 3 weight per cent boron fluoride were conducted. Part of the used catalyst from each reaction was evaporated at room temperature, and the acid-soluble oil which remained as a residue was heated for several hours at an elevated temperature. The boron content of the oil was then determined. The data obtained are given in the table:

Table

| Reaction | Temperature to which Oil was Heated, °F. | Boron Content of Oil After Heating, Wt. Per Cent | $BF_3$ Loss, Per Cent of $BF_3$ Charged |
|---|---|---|---|
| Disproportionation of normal pentane | 392 | 4.8 | 46 |
| Do | 392 | 6.5 | 49 |
| Disproportionation of isopentane | 392 | 4.6 | 20 |
| Normal butane-ethylene alkylation | 302 | 4.8 | 24 |
| Isobutane-ethylene alkylation | 932 | 4.8 | 15 |

EXAMPLE II

Isobutane was alkylated with ethylene at 127° F. and 206 p. s. i. The mol ratio of isobutane to ethylene was 5.44. The catalyst used consisted of 96.9 parts by weight anhydrous hydrogen fluoride and 3.1 parts by weight boron trifluoride, plus a small amount of water and acid-soluble oils. The product was principally branched-chain hexanes, in which diisopropyl predominated. An aliquot portion of the used catalyst was evaporated at room temperature, and the acid-soluble oil, which remained as a residue, was heated at 302° F. for several hours. A sample of the remaining oil was then analyzed and found to contain 4.8 weight per cent boron, which corresponded to 24 per cent of the boron fluoride charged.

The acid-soluble oil which had been thus heated was dissolved in octane and burned in an atmosphere of oxygen. Combustion was substantially complete, and the boron content of the oil was converted to boric oxide.

In a continuous alkylation process, the boric oxide is separated from the other combustion products and is reacted with 20 times its weight of anhydrous hydrofluoric acid. The mixture so obtained is recycled directly to the alkylation step. Boron fluoride consumption is thus substantially reduced and sufficient water is supplied by the reaction between HF and boric oxide to maintain the small amount of water desired in the catalyst.

Various modifications may be made in the procedures and conditions disclosed herein, as will be understood by one skilled in the art. In some cases, for instance, it will be desired to recover from admixture with hydrogen fluoride and water the boron fluoride produced by reacting boric oxide with hydrogen fluoride. This may be accomplished by distillation or otherwise, and the recovered boron fluoride utilized in any desired manner. While mixtures of boron trifluoride with hydrogen fluoride, and mixtures of boron trifluoride with hydrogen fluoride and water, are discussed herein as if the individual components retain their identity, it will be appreciated that this is not necessarily the case in all circumstances, and that such mixtures are believed in many instances to be rather complex in nature. Accordingly, by terms such as "mixture of boron fluoride with hydrogen fluoride,"

"$BF_3$—$HF$—$H_2O$"

or the like, as used in the description and claims, are meant to be included all materials which may result from mixing the compounds named, and all materials which are substantially the same as materials which can be prepared by such mixing. For instance, when boric oxide is reacted with an excess of hydrogen fluoride, it may be that boron fluoride and water as such are not the only products, but the final total reaction product has approximately the same properties as a material which can be prepared by mixing HF, $BF_3$, and $H_2O$ in the required proportions.

I claim:

1. In the conversion of organic materials by means of a catalyst consisting essentially of boron trifluoride and hydrogen fluoride as the catalytic components thereof wherein an acid-soluble boron- and fluorine-containing oil is formed as by-product, the improvement which comprises separating said acid-soluble oil from the bulk of the catalyst, oxidizing so-separated acid-soluble oil to form boric oxide, reacting said boric oxide with hydrogen fluoride to form a $BF_3$—$HF$—$H_2O$ mixture, and using said mixture as at least part of the catalyst for the conversion.

2. In the conversion of hydrocarbons by means of a $BF_3$—$HF$—$H_2O$ catalyst wherein an acid-soluble boron- and fluorine-containing oil is formed as by-product, the improvement which comprises separating said acid-soluble oil from the bulk of the catalyst, burning so-separated acid-soluble oil in an oxygen-containing gas to form boric oxide, reacting said boric oxide with a stoichiometric excess of HF to form a $BF_3$—$HF$—$H_2O$ mixture and using same as at least part of the catalyst for the conversion.

3. The process of claim 2 in which said acid-soluble oil is burned in admixture with a liquid hydrocarbon.

4. In the conversion of hydrocarbons by means of a $BF_3$—$HF$—$H_2O$ catalyst wherein an acid-soluble boron- and fluorine-containing oil is formed as by-product, the improvement which comprises separating said acid-soluble oil from the bulk of the catalyst, heating so-separated acid-soluble oil at such an elevated temperature and for such a time as to effect partial recovery of boron and fluorine therefrom in the form of a gas fraction comprising $BF_3$ and HF while leaving a liquid boron-containing residue, burning said liquid residue in an oxygen-containing gas to form boric oxide, reacting said boric oxide with HF to form a $BF_3$—$HF$—$H_2O$ mixture, and using said $BF_3$—$HF$—$H_2O$ mixture and $BF_3$ and HF contained in said gas fraction as at least part of the catalyst for the conversion.

5. A continuous process for the conversion of hydrocarbons which comprises continuously contacting in a reaction zone hydrocarbon reactant materials with a liquid catalyst comprising a minor proportion of boron trifluoride dissolved in liquid hydrogen fluoride together with a minor amount of water, continuously withdrawing a mixture of hydrocarbons and catalyst from said reaction zone and separating same into a hydrocarbon phase and a catalyst phase, recovering hydrocarbon reaction products from said hydrocarbon phase, continuously recycling the bulk of said catalyst phase to said reaction zone, passing a portion of said catalyst phase to a distillation zone and therein separating same into a boron trifluoride-hydrogen fluoride fraction and a heavier acid-soluble oil fraction containing boron and fluorine in combined form, returning said boron trifluoride-hydrogen fluoride fraction to said reaction zone for incorporation in the catalyst, burning said acid-soluble oil fraction in an atmosphere of oxygen-containing gas, separating boric oxide from combustion gases, reacting said boric oxide with a large excess of concentrated hydrofluoric acid to form a mixture comprising a major proportion of hydrogen fluoride and minor proportions of boron trifluoride and water, and passing said mixture to said reaction zone for incorporation in the catalyst.

6. The process of claim 5 in which said acid-soluble oil fraction before burning is first heated at an elevated temperature to drive off a portion of its boron and fluorine content in the form of boron trifluoride and hydrogen fluoride which are passed to the reaction zone for incorporation in the catalyst.

7. The process of claim 5 in which light hydrocarbon gases are separated from said hydrocarbon phase, and at least a portion of said light gases are admixed in the liquid state with said acid-soluble oil fraction, to assist the handling and burning of the acid-soluble oil.

8. The process of claim 5 in which said conversion is the reaction of an alkylatable hydrocarbon with an alkylating reactant to form branched-chain alkylated hydrocarbons.

9. A process for the reconstruction of saturated hydrocarbons which comprises contacting in a reaction zone saturated hydrocarbons with a liquid catalyst comprising a minor proportion of boron trifluoride dissolved in liquid hydrogen fluoride together with a minor amount of water, said boron trifluoride being present in molar excess of said water, withdrawing a mixture of hydrocarbons and catalyst from said reaction zone and separating same into a hydrocarbon phase and a catalyst phase, recovering reconstructed saturated hydrocarbons from said hydrocarbon phase as a product of the process, returning the bulk of said catalyst phase to said reaction zone, passing a portion of said catalyst phase to a distillation zone and therein separating same into a light boron trifluoride-hydrogen fluoride fraction and a heavy acid-soluble oil fraction containing boron and fluorine in combined form, returning said boron trifluoride-hydrogen fluoride fraction to said reaction zone for incorporation in the catalyst, burning said acid-soluble oil fraction in an atmosphere of oxygen-containing gas, separating boric oxide from combustion gases, reacting said boric oxide with a large excess of concentrated hydrofluoric acid to form a mixture comprising a major proportion of hydrogen fluoride and minor proportions of boron trifluoride and water, and passing said mixture to said reaction zone for incorporation in the catalyst.

10. The process of claim 9 in which excess water is separated from the system by withdrawing a water-containing fraction from said distillation zone.

11. The process of claim 9 in which normal pentane is subjected to reaction conditions effecting reconstruction of same to form isobutane, isopentane, and hexane and heavier hydrocarbons.

12. The process of claim 9 in which excess water is separated from the system by distilling a water-containing boron trifluoride-hydrogen fluoride mixture in the presence of sulfuric acid to dehydrate the mixture.

GEORGE N. CADE.

REFERENCES CITED

The following references are of record in the file of this patent:

UNITED STATES PATENTS

| Number | Name | Date |
|---|---|---|
| 2,109,340 | Nieuwland et al. | Feb. 22, 1938 |
| 2,135,454 | McAlevy | Nov. 1, 1938 |
| 2,296,370 | Slotterbeck | Sept. 22, 1942 |
| 2,339,248 | Danforth | Jan. 18, 1944 |
| 2,339,249 | Danforth | Jan. 18, 1944 |
| 2,363,116 | Bruner | Nov. 21, 1944 |
| 2,381,027 | Balderschwieler et al. | Aug. 7, 1945 |
| 2,405,995 | Burk | Aug. 20, 1946 |